United States Patent
Nagayama et al.

(10) Patent No.: US 6,473,548 B2
(45) Date of Patent: Oct. 29, 2002

(54) MULTIPLE FIBER OPTICAL CABLE AND METHOD OF MANUFACTURING MULTIPLE FIBER OPTICAL CABLE

(75) Inventors: Katsuya Nagayama; Kaoru Okuno; Eisuke Sasaoka; Masayuki Nishimura, all of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 20 days.

(21) Appl. No.: 09/726,602

(22) Filed: Dec. 1, 2000

(65) Prior Publication Data

US 2001/0002943 A1 Jun. 7, 2001

(30) Foreign Application Priority Data

Dec. 2, 1999 (JP) ............................................ 11-343477

(51) Int. Cl.[7] .............................................. G02B 6/255
(52) U.S. Cl. ..................................................... 385/100
(58) Field of Search .......................... 385/100–113, 147

(56) References Cited

U.S. PATENT DOCUMENTS

| | | | |
|---|---|---|---|
| 5,611,016 A | * | 3/1997 | Fangmann et al. ......... 385/100 |
| 5,851,259 A | | 12/1998 | Clayton et al. |
| 5,878,182 A | * | 3/1999 | Peckham .................... 385/123 |
| 5,887,105 A | | 3/1999 | Bhagavatula et al. |
| 5,894,537 A | | 4/1999 | Berkey et al. |
| 5,905,838 A | * | 5/1999 | Judy et al. .................. 359/109 |
| 6,044,191 A | | 3/2000 | Berkey et al. |
| 6,289,699 B1 | * | 9/2001 | Kewitsch et al. .......... 264/1.25 |

FOREIGN PATENT DOCUMENTS

| | | |
|---|---|---|
| JP | 8-320419 | 12/1996 |
| JP | 10-139463 | 5/1998 |
| JP | 10-167750 | 6/1998 |
| JP | 11-30725 | 2/1999 |

\* cited by examiner

*Primary Examiner*—Akm E. Ullah
(74) *Attorney, Agent, or Firm*—McDermott, Will & Emery (57) ABSTRACT

A multiple fiber optical cable includes bundled plural optical fibers. In each of the optical fibers to be bundled in the optical cable, a positive dispersion section having a positive chromatic dispersion in an optical signal wavelength and a negative dispersion section having a negative chromatic wavelength and a negative dispersion section having a negative chromatic dispersion section in the optical signal wavelength are alternately arranged so that the chromatic dispersion characteristic of the optical fiber alternately changes in the longitudinal direction. The chromatic dispersion characteristics of the respective bundled plural optical fibers coincide with each other at at least the position of each end of the multiple fiber optical cable. The member which surrounds the optical fibers of the optical cable is provided with the identification marks for identifying the chromatic dispersion characteristics at the individual locations in the longitudinal direction.

4 Claims, 7 Drawing Sheets

MULTIPLE FIBER OPTICAL CABLE AND METHOD OF MANUFACTURING MULTIPLE FIBER OPTICAL CABLE

BACKGROUND OF THE INVENTION

1. Field of the Invention

The present invention relates to a multiple fiber optical cable in which plural optical fibers are bundled, and to a method of manufacturing the multiple fiber optical cable. The term "cable" to be used in this application encompasses an optical fiber ribbon.

2. Related Back Ground Art

Optical fibers in their longitudinal direction of which the light propagation characteristic changes in order to improve the light propagation characteristic of optical fiber transmission lines in optical communication systems have been known. For example, an optical fiber disclosed in Japanese Patent Application Laid-Open No. HEI 8-320419 is one in which the core diameter or the refractive index of core is changed in the longitudinal direction of the optical fiber, so as to adjust chromatic dispersion, and in which positive dispersion section and negative dispersion section having positive dispersion and negative one, respectively, are disposed alternately. The optical fiber disclosed in Japanese Patent Application Laid-Open No. HEI 11-30725 is one in which the core diameter and the fiber diameter are changed in the longitudinal direction so as to adjust chromatic dispersion, and in which positive dispersion section and negative dispersion section having positive dispersion and negative one, respectively, are disposed alternately. The respective optical fibers disclosed in these two publications lower the absolute value of average chromatic dispersion as a whole, while enhancing the absolute value of chromatic dispersion in each of the positive dispersion section and negative dispersion section, thereby making it possible to prevent transmission quality deterioration being due to nonlinear optical phenomena or cumulative chromatic dispersion.

On the other hand, the optical fiber disclosed in Japanese Patent Application Laid-Open No. HEI 10-139463 is one in which the drawing tension upon drawing is alternately changed between a higher tension value and a lower tension value so as to adjust the residual stress, according to which chromatic dispersion is changed in the longitudinal direction. As a consequence, the loss resulting from Brillouin scattering can be reduced. The optical fiber disclosed in Japanese Patent Application Laid-Open No. HEI 10-167750 is one in which the drawing tension at the time of drawing is changed so as to adjust the residual stress, according to which chromatic dispersion is changed in the longitudinal direction. As a consequence, soliton pulse compression can be effected.

In addition, there are cases where plural optical fibers are bundled into a multiple fiber optical cable in order to increase the capacity of optical communication. The term "multiple fiber optical cable" to be used herein encompasses an optical fiber cable in which plural optical fibers are bundled, a tape-shaped ribbon in which plural optical fibers are arranged in parallel in a flat shape and are integrally coated, an optical fiber cable in which plural such ribbons are bundled, or the like. The term "optical cable" is used as the term "multiple fiber optical cable" hereinbelow.

SUMMARY OF THE INVENTION

In order to improve the optical propagation characteristics of optical fiber transmission paths in optical communication systems and to increase the capacity of optical communication, it can be considered to use an optical cable formed by preparing plural optical fibers each of which has a chromatic dispersion characteristic changed in its longitudinal direction, and bundling these plural optical fibers into an optical cable. However, the inventor of the present application has found out that such an optical cable has the following problems.

Specifically, since the optical propagation characteristic of each of the optical fibers of the optical cable changes in its longitudinal direction, if the optical cable is cut into a predetermined length, the overall optical propagation characteristic of the optical cable may differ from a desired value even if the overall optical propagation characteristic of each of the bundled plural optical fibers has a desired value. In addition, when an optical fiber ribbon is connected or spliced to other optical fibers, the resultant overall optical propagation characteristic inclusive of that of the other optical fibers may differ from a desired value. Furthermore, each of the plural optical fibers bundled in the optical fiber ribbon will show a different change in its overall optical propagation characteristic.

In an optical fiber ribbon in which diameter of each of plural optical fibers is changed to adjust the optical propagation characteristic thereof, the losses of fusion splicing to other optical fibers may become large depending on the diameter of each fiber at each end of the ribbon. In addition, in this cases when the optical fiber ribbon is to be connected to other optical fibers by means of an optical fiber connector, if the fiber diameter of each of the optical fibers bundled in the optical fiber ribbon is larger than a diameter of a ferrule of the optical fiber connector, the optical fiber cannot be inserted into the ferrule. On the other hand, if the fiber diameter of each of the optical fibers bundled in the optical fiber ribbon is smaller than the diameter of the ferrule of the optical fiber connector, the central position of the optical fiber in the ferrule is not defined, so that connection losses or splice losses may become large.

The present invention has been made to solve the above-described problems, and the purpose is to provides an optical cable which Includes bundled plural optical fibers of which is changed optical propagation characteristic in their respective longitudinal directions so that degradations or deviations can be restrained from occurring in the chromatic dispersion characteristics during cutting or connection.

The optical cable according to the present invention is characterized plural optical fibers which have chromatic dispersion characteristics changing in their respective longitudinal directions are bundled so that the chromatic dispersion characteristics of the respective plural optical fibers coincide with each other at the end positions at least.

According to this optical cable, since the chromatic dispersion characteristics of the respective plural optical fibers coincide with each other at the end positions, the overall chromatic dispersion characteristic of each of the optical fibers which constitute the optical cable can be made to have a desired value. Since the chromatic dispersion characteristics of the respective plural optical fibers coincide with each other at the end positions in this manner, even if other optical fibers are connected or spliced to the respective plural optical fibers, the amounts of changes due to the connection or splice in the overall optical propagation characteristics inclusive of those of the respective plural optical fibers and those of the other optical fibers remain the same if the other optical fibers have the same characteristics. Accordingly, in this optical cable, if the initial overall chromatic dispersion characteristics of the respective plural optical fibers are the same, when the respective plural optical fibers are connected or spliced to the other optical fibers, the resultant overall chromatic dispersion characteristics remain the same, whereby the overall chromatic dispersion characteristics of the respective optical fibers can readily be made to have desired values and degradations and deviations in chromatic dispersion characteristic due to the connection or splice can be restrained. In addition, the optical cable can be cut so that the chromatic dispersion characteristics of the respective optical fibers are the same from one end of the optical cable to a cut portion. In particular, in the case where the chromatic dispersion characteristics of the respective optical fibers coincide with each other at individual locations in the longitudinal direction, even if the optical cable is partly cut at one end, the amounts of changes due to this cutting in the chromatic dispersion characteristics of the respective plural optical fibers are the same.

The optical cable in accordance with the present invention may be characterized in that each of the bundled plural optical fibers is provided with identification marks for identifying chromatic dispersion characteristics at its individual locations in the longitudinal direction. In this case, on the basis of these identification marks, it is possible to identify the chromatic dispersion characteristics of each of the plural optical fibers at the individual locations in the longitudinal direction thereof. Accordingly, it is possible to confirm the chromatic dispersion characteristic of each of the plural optical fibers at the end position during cutting or connecting or splicing.

The optical cable in accordance with the present invention may be characterized in that the chromatic dispersion characteristics of the respective bundled plural optical fibers coincide with each other at individual locations in the longitudinal direction of the optical cable, and a surrounding member of the plural optical fibers is provided with an identification mark for identifying the chromatic dispersion characteristics at the individual locations in the longitudinal direction. In this case, on the basis of the identification mark provided on the surrounding member of the plural optical fibers, it is possible to identify the chromatic dispersion characteristics of each of the plural optical fibers at its individual location in the longitudinal direction. Accordingly, it is possible to confirm the chromatic dispersion characteristic of each of the plural optical fibers at the end position during cutting or connecting or splicing.

An optical cable manufacturing method according to the present invention includes the steps of: producing plural optical fibers which have changing chromatic dispersion characteristics and which are provided with identification marks for identifying the each of their chromatic dispersion characteristics at their individual locations in the longitudinal direction; and the optical cable is produced by bundling the plural optical fibers on the basis of the identification marks provided on the respective plural optical fibers so that the chromatic dispersion characteristics of the respective optical fibers coincide with each other at at least the end position of the optical cable.

Another optical cable manufacturing method according to the present invention includes the steps of: producing plural optical fibers which have chromatic dispersion characteristics changing in their respective directions in the longitudinal direction, the chromatic dispersion characteristics of each of the plural optical fibers at individual locations in the longitudinal direction thereof being memorized when each of the plural optical fibers is being produced; and the optical cable is produced by bundling the plural optical fibers, on the basis of the chromatic dispersion characteristics at the individual locations in the longitudinal direction which are memorized to each of the plural optical fibers, so that the chromatic dispersion characteristics of the respective optical fibers coincide with each other at at the least end position of the optical cable.

According to either of these optical cable manufacturing methods, it is possible to suitably manufacture the optical cable according to the present invention.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Preferred embodiments of an optical cable according to the present invention and a method of manufacturing the optical cable will be described below with reference to the accompanying drawings. In the description of the drawings, identical elements are denoted by identical reference numerals, and the repetition of the same description is omitted.

Figure 1:
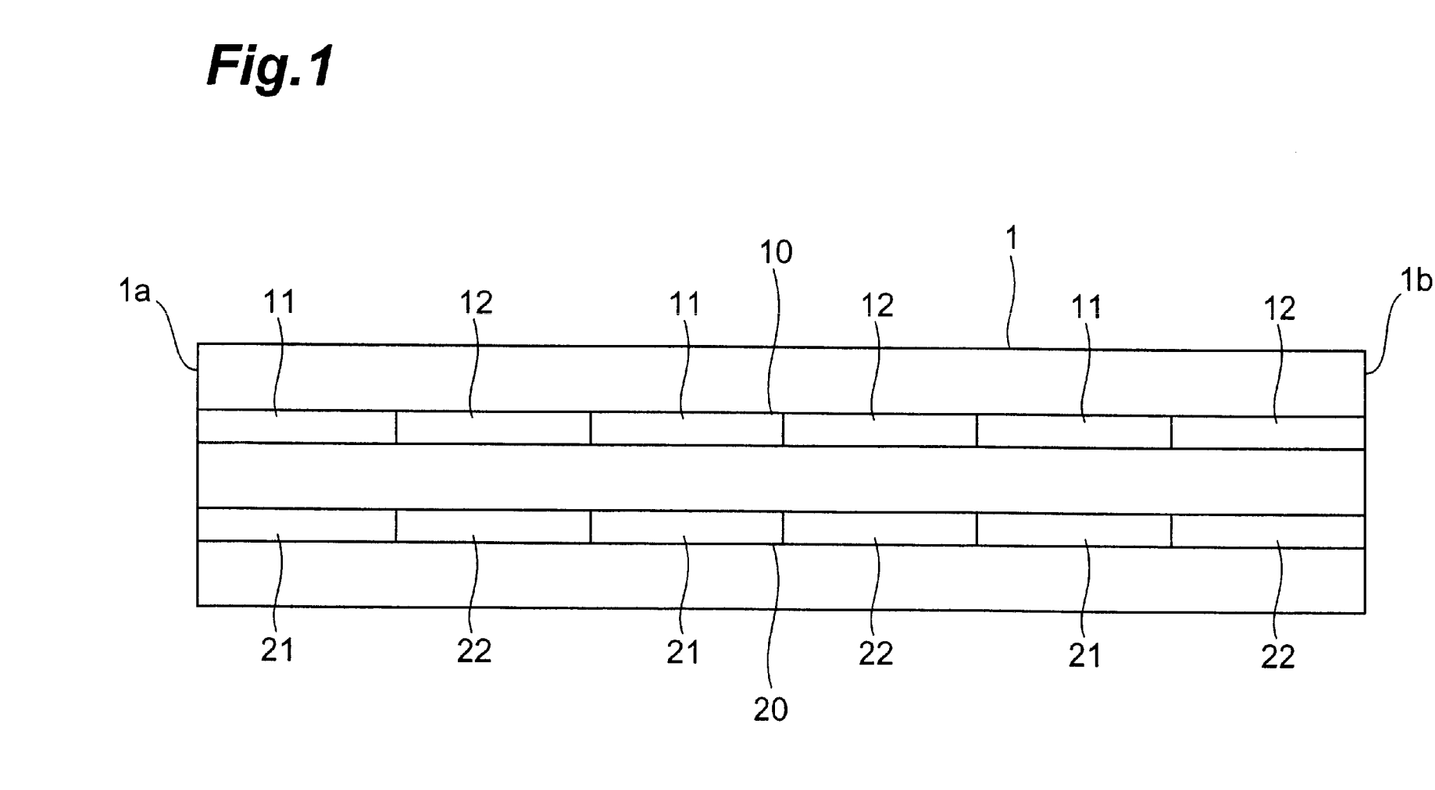
FIG. 1 is an explanatory view of an optical cable according to a embodiment of the present invention.

Embodiments of the optical cable according to the present invention will be described below. FIG. 1 is an explanatory view of an optical cable 1 according to an embodiment of the present invention. This optical cable 1 includes bundled plural (in FIG. 1, two) optical fibers 10 and 20. Incidentally, the term "optical cable" to be used herein encompasses an optical fiber cable in which plural optical fibers are bundled, a tape core in which plural optical fibers are arranged in parallel in a flat shape and are entirely clad, an optical fiber cable in which plural such tape cores are bundled, or the like.

Figure 2A:
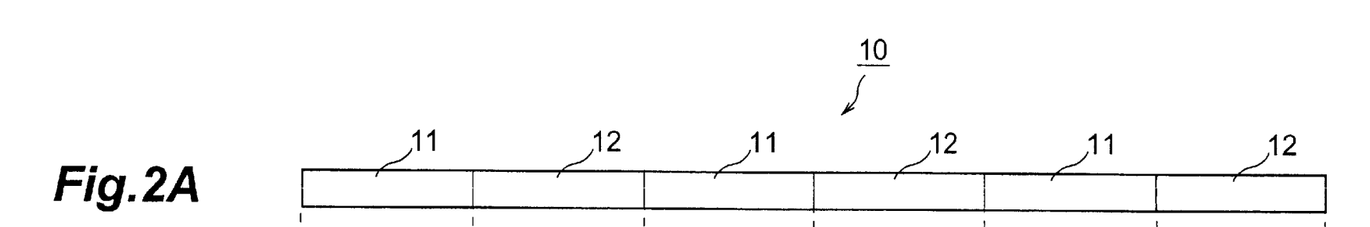
FIG. 2A is an explanatory view of the optical cable according to t embodiment of the present invention.
Figure 2B:
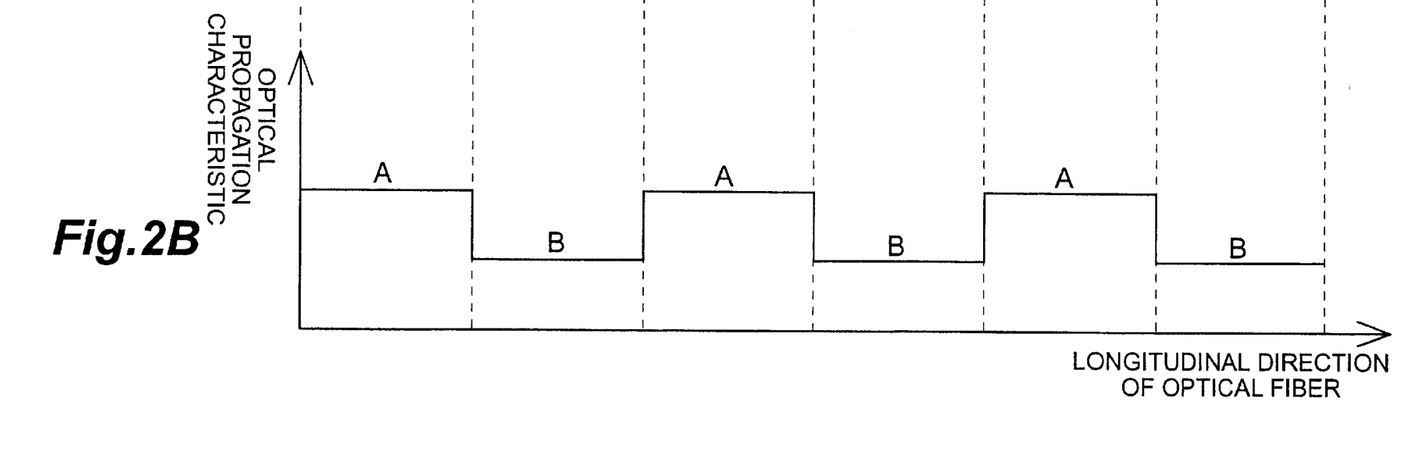
FIG. 2B is a chart showing the change in optical propagation characteristic of the optical cable shown in FIG. 2A in longitudinal direction.

In the optical fiber 10 which constitutes the bundle, as shown in FIGS. 2A and 2B, a section 11 in which its chromatic dispersion characteristic is a characteristic A and a section 12 in which its chromatic dispersion characteristic is a characteristic B are alternately arranged so that the chromatic dispersion characteristic of the optical fiber 10 changes in the longitudinal direction. The section 11 and the section 12 are suitably provided with identification marks for identifying the characteristics A and B, respectively. Specifically, it is suitable that the section 11 and the section 12 which differ from each other in chromatic dispersion characteristic are provided with mutually different identification marks.

Similarly, in the optical fiber 20 which constitutes the bundle, a section 21 in which its chromatic dispersion characteristic is the characteristic A and the section 22 in which its chromatic dispersion characteristic is the characteristic B are alternately arranged so that the chromatic dispersion characteristic of the optical fiber 20 changes in the longitudinal direction. The section 21 and the section 22 are suitably provided with identification marks for identifying the characteristics A and B, respectively. Specifically, it is suitable that the section 21 and the section 22 which differ from each other in chromatic dispersion characteristic are provided with mutually different identification marks.

The identification marks may be any kind of matter that makes it possible to identify the chromatic dispersion characteristics, for example, marks incorporated in the primary coating layer or the secondary coating layer of each of the optical fiber 10 and the optical fiber 20, i.e., the color or shading of the resin of the primary or secondary coating layer, or marks put on the coating layer. It is suitable that these identification marks are visible.

If the section 11 is a positive dispersion section having a positive chromatic dispersion in an optical signal wavelength and the section 12 is a negative dispersion section having a negative chromatic dispersion section in the optical signal wavelength, this indicates that the optical fiber 10 is one of the type in which the positive dispersion section 11 and the negative dispersion section 12 are alternately arranged. This type of optical fiber 10 is capable of preventing degradation of its transmission quality due to a nonlinear optical phenomenon or a cumulative chromatic dispersion by decreasing the absolute value of its overall average chromatic dispersion, while increasing the absolute values of the chromatic dispersions in the negative dispersion section 11 and the positive dispersion section 12. This optical fiber 10 can be cut or connected or spliced on the basis of the identification marks so that it can effectively achieve such an advantage. This fact similarly applies to the optical fiber 20.

The optical fiber 10 which alternately has the positive dispersion section 11 and the negative dispersion section 12 is manufactured in such a way that a drawing tension at which to draw an optical fiber from an optical fiber preform is adjusted so that a stress according to the drawing tension remains in its core and changes are produced in the refractive index of the optical fiber according to this residual stress. Otherwise, the optical fiber 10 is manufactured in such a way that while an optical fiber is being drawn from an optical fiber preform which has a refractive index profile uniform in its longitudinal direction, the fiber diameter and the core diameter of the optical fiber are changed in the longitudinal direction. Otherwise, the optical fiber 10 is manufactured in such a way that while an optical fiber is being drawn from an optical fiber preform which has a core diameter uniform in its longitudinal direction and a preform diameter changing in the longitudinal direction, the fiber diameter of the optical fiber is kept uniform in the longitudinal direction to change the core diameter of the same in the longitudinal direction. The optical fiber 20 is also manufactured in a similar way.

For example, a coating layer for each of the positive dispersion section 11 may be colored red and a coating layer for each of the negative dispersion sections 12 may be colored blue. Otherwise, a particular mark may be put on the coating layer for each of the positive dispersion sections 11, and another particular mark may be put on the coating for each of the negative dispersion sections 12. With this construction, the chromatic dispersion characteristic at each location in the longitudinal direction can readily be grasped on the basis of the corresponding identification mark, and the overall average chromatic dispersion of the optical fiber 10 can readily be found from the chromatic dispersion in and the section length of each of the positive dispersion sections 11 and the negative dispersion sections 12. Moreover, when the optical fiber 10 is cut or connected or spliced to another optical fiber, a resultant overall average chromatic dispersion can readily be predicted. Accordingly, the optical fiber 10 can be cut or connected or spliced so that the overall chromatic dispersion characteristic has a desired value. The optical fiber 20 can also be processed in a similar manner.

The optical cable 1 according to the embodiment of the present invention is characterized in that the chromatic dispersion characteristics of the respective optical fibers 10 and 20 coincide with each other at at least the end position. Specifically, as shown in FIG. 1, the sections 11 and 21 of the optical fiber 10 are the same in length and the sections 21 and 22 of each of the optical fiber 20 are the same in length, and the optical fibers 10 and 20 have the same characteristic A at a left end 1a of the optical cable 1, while the optical fibers 10 and 20 have the same characteristic B at a right end 1b of the optical cable 1.

In this manner, the chromatic dispersion characteristics of the optical fibers 10 and 20 coincide with each other at each of the opposite end positions of the optical cable 1. Accordingly, even if an end portion of the optical cable 1 is partly cut, the amounts of changes due to this cutting in the chromatic dispersion characteristics of the respective optical fibers 10 and 20 are the same. In addition, even when other optical fibers are respectively connected to the optical fibers 10 and 20, if the other optical fibers have the same characteristic, the amounts of changes by this connection in the overall average chromatic dispersion characteristics of the respective optical fibers 10 and 20 and the other optical fibers are the same. Accordingly, if the initial overall chromatic dispersion characteristics of the respective optical fibers 10 and 20 of this optical cable 1 are the same, even when an end portion of the optical cable 1 is cut or the respective optical fibers 10 and 20 are connected or spliced to the other optical fibers, the resultant overall chromatic dispersion characteristics of the respective optical fibers 10 and 20 are the same, whereby the overall average chromatic dispersion characteristics can readily be made the desired values, respectively.

In another construction in which the fiber diameter of the optical cable 1 is changed to adjust the respective chromatic dispersion characteristics of the optical fibers 10 and 20 bundled in the optical cable 1, the fiber diameter of each of the optical fibers 10 and 20 is made equal to 125 μm at each end position of the optical cable 1, whereby it is possible to reduce splice losses due to the fusion splicing of the optical fibers 10 and 20 to other optical fibers or it is possible to reduce connection losses due to connecting of the optical fibers 10 and 20 to other optical fibers by an optical fiber connector.

Moreover, in the case where the chromatic dispersion characteristics of the respective optical fibers 10 and 20 are the same at each longitudinal location of the optical cable 1 as shown in FIG. 1, it is suitable that at whatever longitudinal location the optical cable 1 may be cut, the amounts of changes due to this cutting in the chromatic dispersion characteristics of the optical fibers 10 and 20 are the same.

Figure 3A:
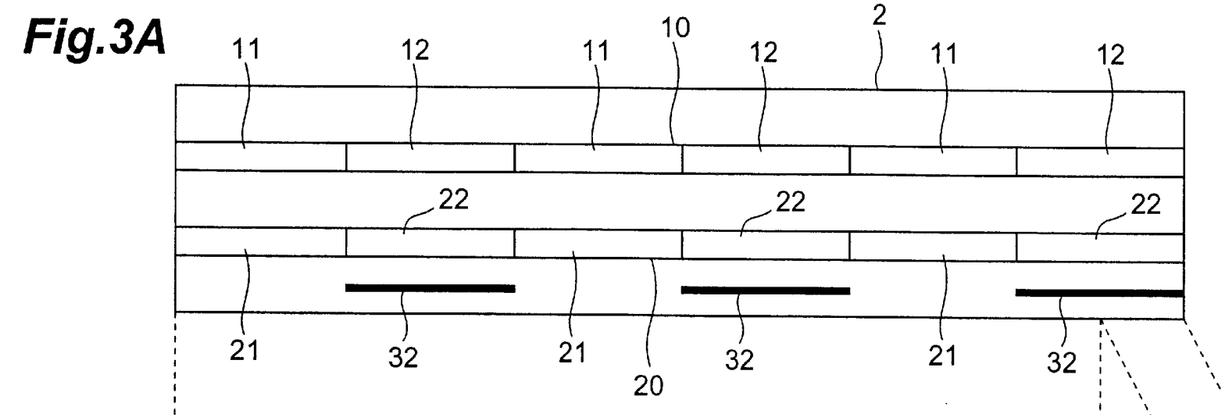
FIG. 3A is an explanatory view of an optical cable according to another embodiment of the present invention.
Figure 3B:
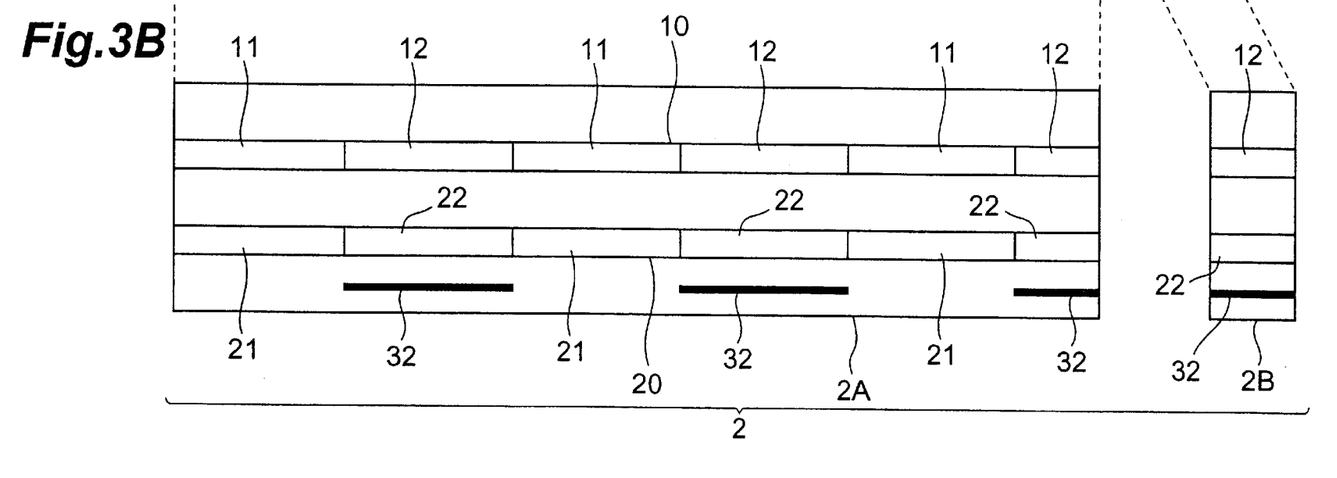
FIG. 3B is an explanatory view of the optical cable according to the embodiment of the present invention.

FIGS. 3A and 3B are explanatory views of an optical cable 2 according to another embodiment of the present invention. The optical cable 2 shown in FIG. 3A includes bundled plural (in FIG. 3A, two) optical fibers 10 and 20, and the chromatic dispersion characteristics of the respective optical fibers 10 and 20 are the same at each location of longitudinal direction. In this respect, the optical cable 2 is similar to the optical cable 1 described above in connection with FIG. 1.

Moreover, in the optical cable 2, a member which surrounds the optical fibers 10 and 20 is provided with identification marks 32 for identifying chromatic dispersion characteristics at the individual locations in the longitudinal direction. The identification marks may be any kind of matter that makes it possible to identify chromatic dispersion characteristics, for example, color, shade of color or symbols. It is suitable that these identification marks are visible. In FIG. 3A, each section in which the chromatic dispersion characteristic is the characteristic B is provided with a linear identification mark 32 in a color different from a base color. The member which surrounds the optical fibers 10 and 20 is, for example, a tape coating layer which covers the optical fibers 10 and 20 in the form of tape in the case where the optical cable 2 is a tape-shaped ribbon, or the charged resin or the sheath of an optical fiber unit in the case where the optical cable 2 is an optical cable.

Since the member which surrounds the optical fibers 10 and 20 of the optical cable 2 is provided with the identification marks 32 for identify the chromatic dispersion characteristics at the individual locations in the longitudinal direction, the chromatic dispersion characteristics at the individual locations can be visibly recognized from the outside. In addition, in the case where the chromatic dispersion characteristics of the respective optical fibers 11 and 21 are the same at each location in the longitudinal direction of the optical cable 2 as shown in FIG. 3B, if the optical cable 2 is to be cut into an optical cable 2A and an optical cable 2B, it is possible to readily predict chromatic dispersion characteristics which will appear in the respective optical fibers 10 and 20 after the optical cable 2A is cut from the optical cable 2, whereby the chromatic dispersion characteristics of the respective optical fibers 10 and 20 can readily be made the desired values. In addition, if other optical fibers are to be connected or spliced to the respective optical fibers 10 and 20 of the optical cable 2, it is possible to readily predict chromatic dispersion characteristics which will appear in the respective optical fibers 10 and 20 after the other optical fibers are connected or spliced to the respective optical fibers 10 and 20, whereby the chromatic dispersion characteristics of the respective optical fibers 10 and 20 can readily be made the desired values.

Figure 4:
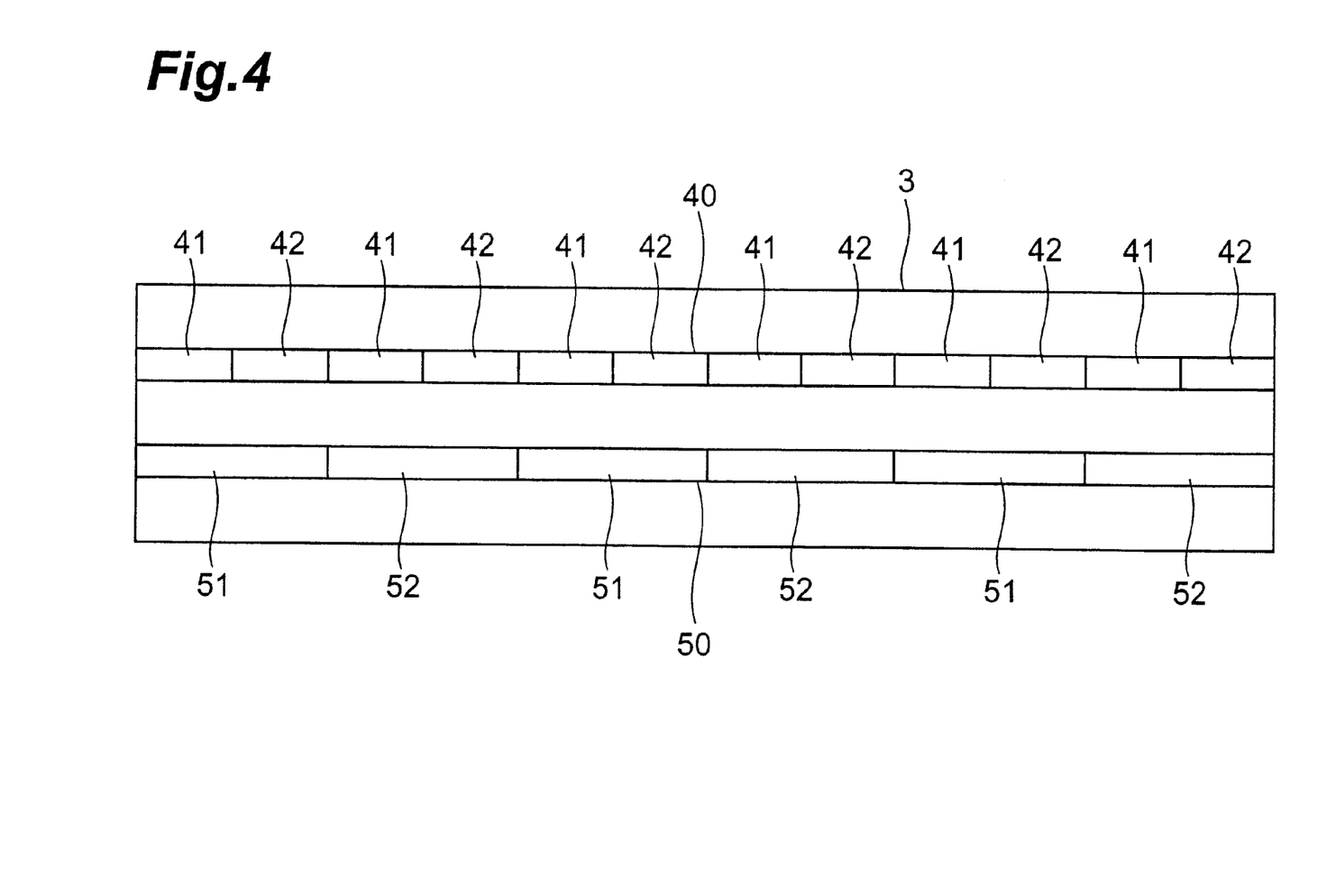
FIG. 4 is an explanatory view of the optical cable according to another embodiment of the present invention.
Figure 5:
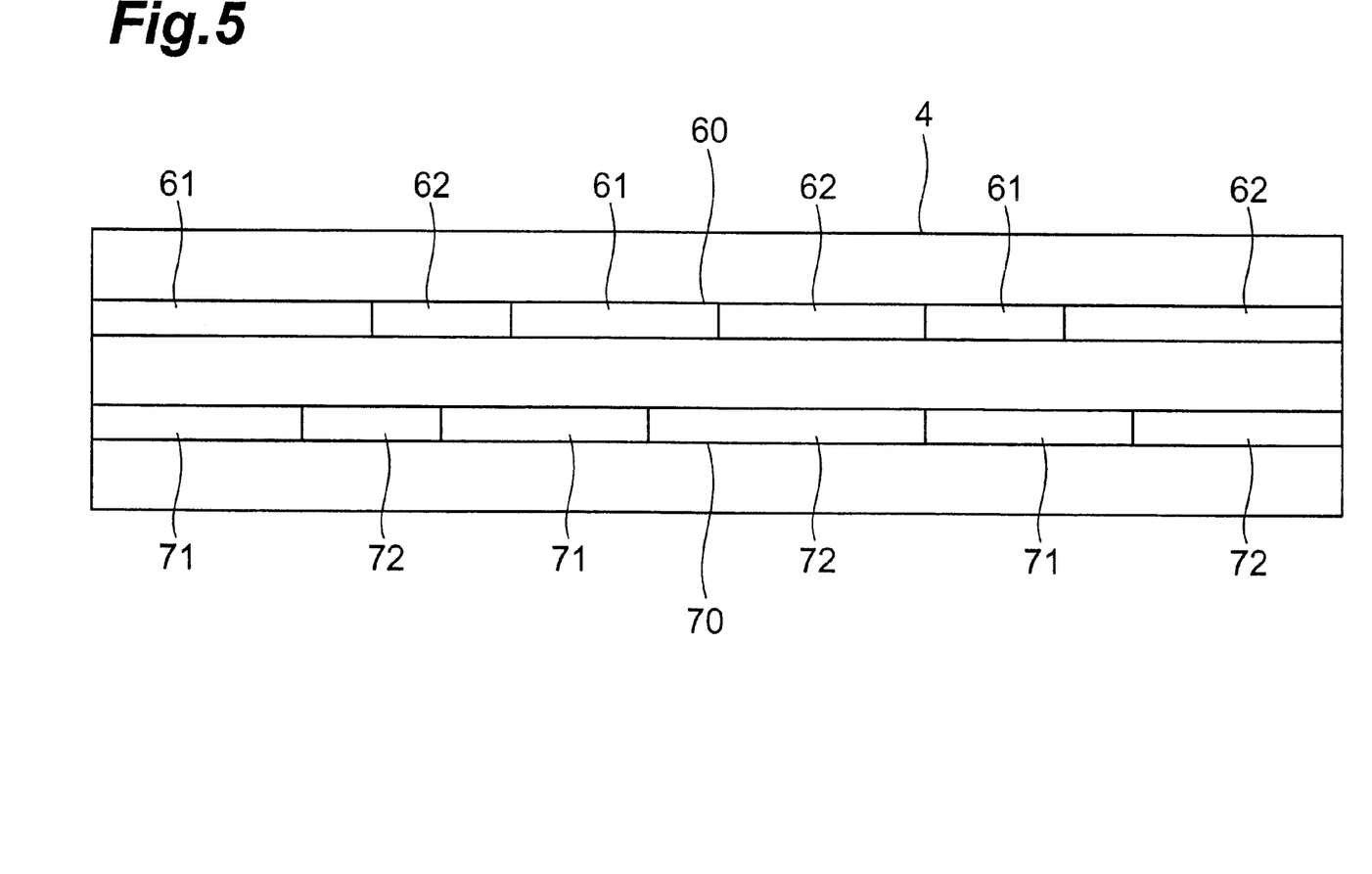
FIG. 5 is an explanatory view of the optical cable according to another embodiment of the present invention.

It is to be noted that the optical cable according to the present invention dose not necessarily include plural optical fibers whose chromatic dispersion characteristics are the same at individual locations in the longitudinal direction, and need only to have plural optical fibers whose chromatic dispersion characteristics coincide at at least the position of each end of the optical cable. As in an optical cable 3 shown in FIG. 4 by way of example, period of the chromatic dispersion characteristic change in the longitudinal direction of an optical fiber 40 in which sections 41 and 42 which differ from each other in chromatic dispersion characteristic are alternately arranged in the longitudinal direction and the period of chromatic dispersion characteristic change in the longitudinal direction of an optical fiber 50 in which sections 51 and 52 which differ from each other in chromatic dispersion characteristic are alternately arranged in the longitudinal direction may be made different from each other. Otherwise, as in an optical cable 4 shown in FIG. 5, in an optical fiber 60 in which sections 61 and 62 which differ from each other in chromatic dispersion characteristic are alternately arranged in the longitudinal direction, and in an optical fiber 70 in which sections 71 and 72 which differ from each other in chromatic dispersion characteristic are alternately arranged in the longitudinal direction, chromatic dispersion characteristic change in the longitudinal direction may not be periodic.

Figure 6:
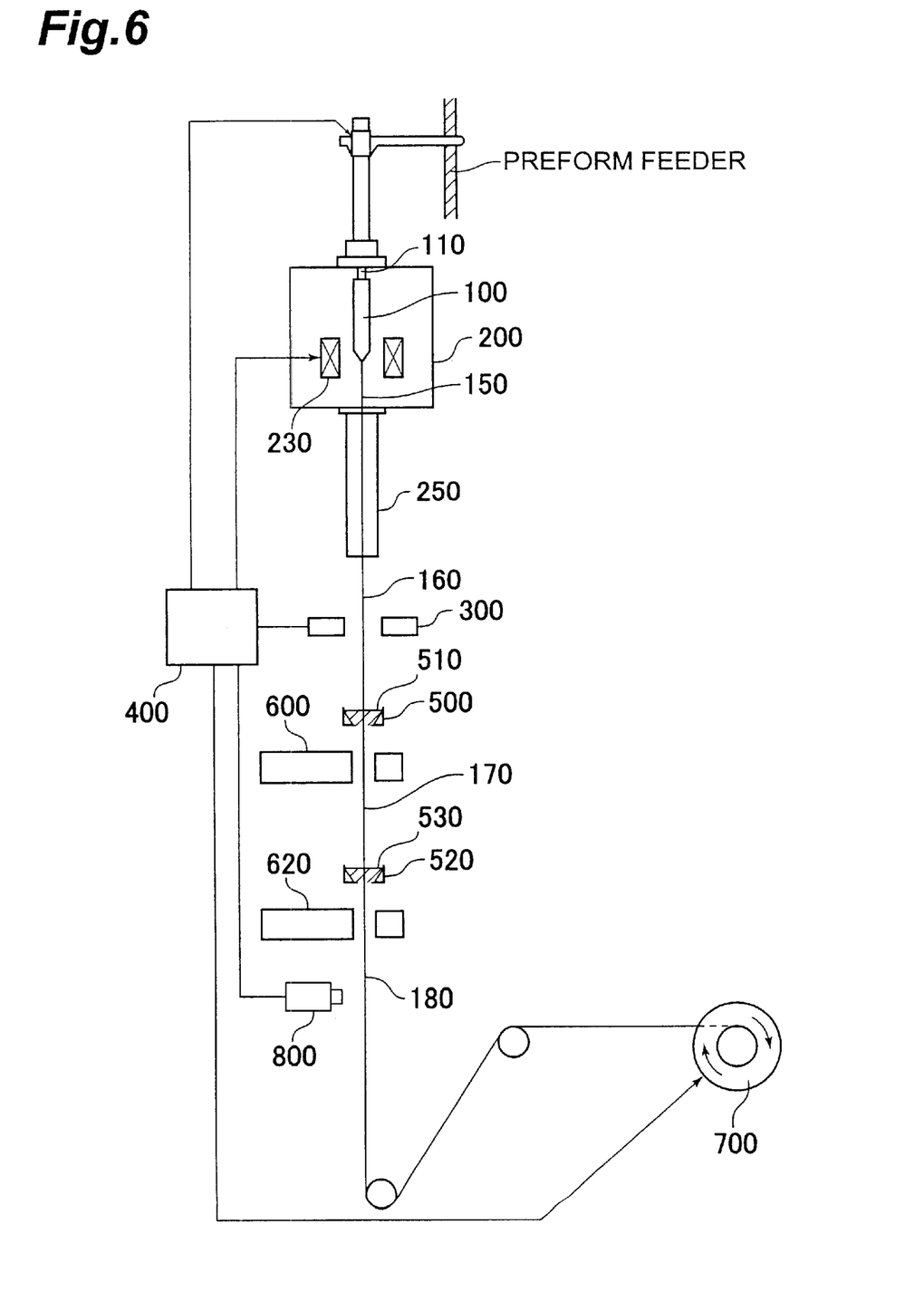
FIG. 6 is a process diagram of a method of manufacturing an optical fiber having chromatic dispersion changing in the longitudinal direction.

A method of manufacturing each of the optical fibers 10 and 20 to be bundled in the optical cable 1 will be described below. FIG. 6 is a process diagram showing a method of manufacturing the optical fiber 10 which changes in chromatic dispersion characteristic in the longitudinal direction. The optical fiber 20 is also manufactured through a similar process.

In this optical fiber manufacturing method, first of all, an optical fiber preform 100 is prepared. The optical fiber preform 100 is essentially made of silica glass, and is made by vapor-phase axial deposition method (VAD method), outside vapor deposition method (OVD method), inside vapor deposition method (IVD method, e.g. MCVD method (modified chemical vapor deposition method)), rod-in-tube method, or the like.

This optical fiber preform 100 is secured to a dummy rod 110, and the dummy rod 110 is set in a drawing furnace 200. Then, an inert gas ($N_2$, He, Ar, or the like) is supplied into the drawing furnace 200, and the bottom end portion of the optical fiber preform 100 is heated by a heater 230 and an optical fiber 150 is drawn from thus heated optical fiber preform 100.

An optical fiber 160 which has exited from a furnace extension tube 250 disposed below the drawing furnace 200 is forcedly cooled, and the outer diameter of the optical fiber 160 is measured by an laser outside diameter meter 300. The result of this outer-diameter measurement is reported to a drawing control section 400, and the drawing control section 400 controls heating temperature and drawing speed on the basis of the measurement result so that the outer diameter of the optical fiber 160 reaches a predetermined value. A forcedly cooling part may be disposed upstream of or upstream and downstream of the laser outside diameter meter 300.

The optical fiber 160 which has passed through the laser outside diameter meter 300 passes through a liquid organic resin 510 stored in a resin coating die 500. When the optical fiber 160 passes through the liquid organic resin 510, the resin is applied to the surface of the optical fiber 160. Subsequently, the optical fiber 160 to which the resin is applied is subjected to resin curing by ultraviolet-ray irradiation with an UV lamp 600, whereby an optical fiber 170 coated by a soft primary resin coating is formed.

Moreover, the optical fiber 170 passes through a liquid organic resin 530 stored in a resin coating die 520. When the optical fiber 170 passes through the liquid organic resin 530, the resin is applied to the surface of the optical fiber 170. Subsequently, the optical fiber 170 to which the resin is applied is subjected to resin curing by ultraviolet-ray irradiation with an UV lamp 620, whereby an optical fiber 180 coated by a hard secondary resin coating is formed. Then, the optical fiber 180 is taken up by a drum 700.

In this optical fiber manufacturing method, while the optical fiber 180 is being drawn from the optical fiber preform 100, the chromatic dispersion characteristic of the optical fiber 180 is made to change in the longitudinal direction thereof. The change in the chromatic dispersion characteristic can be effected by changing, for example, drawing tension or fiber diameter. The change in drawing tension or fiber diameter may be managed on the basis of optical fiber length or time. The change in drawing tension may be realized by changing the temperature of a molten portion of the optical fiber preform 100 in the drawing furnace 200 during drawing, or may also be realized by changing the drawing speed of the optical fiber 180 during drawing. In addition, during drawing, the outer diameter of the optical fiber 180 may also be changed in synchronism with the change in drawing tension.

Then, on the basis of setting information as to chromatic dispersion characteristics in this drawing, the drawing control section 400 provides each location in the longitudinal direction of the optical fiber 180 with identification marks for identifying the chromatic dispersion characteristics. Otherwise, on the basis of the value of the fiber diameter measured through the laser outside diameter meter 300, the drawing control section 400 provides each location in the longitudinal direction of the optical fiber 180 with identification marks for identifying the chromatic dispersion characteristics. During providing the optical fiber 180 with the identification marks, for example, an ink is projected from an ink jet nozzle 800 which is controlled by the drawing control section 400 as shown in FIG. 6, so as to color a coating layer made of the soft-resin coating and a coating layer made of the hard-resin coating, which layers are included in the primary coating layer of the optical fiber 180 which consists of the soft-resin coating and the hard-resin coating, or so as to provide the primary coating layer with marks. Otherwise, the color of the liquid organic resin 530 to be fed to the resin coating die 520 may be changed to change the color of the primary coating layer. Specifically, two or more pipes through which different resins are fed to the resin coating die 520 are disposed so that the respective colors of the resins can be made different. On the basis of the setting information as to the chromatic dispersion characteristics, or on the basis of the measured value of the fiber diameter, the pipes through which the resins are fed are instantaneously switched from one to another in response to a signal from the drawing control section 400. The optical fiber 180 provided with the identification marks in this manner is the above-described optical fiber 10.

If an optical fiber which is constant in fiber diameter and changes in core diameter in its longitudinal direction is drawn from an optical fiber preform which is changed in core diameter in its longitudinal direction, the drawing conditions change in each portion of the optical fiber that changes in core diameter. The change of conditions normally appears as change of the line speed owing to the control system of a drawing apparatus which makes the fiber diameter constant in spite of change of the molten state of the optical fiber preform. In response to these changes, the optical fiber can be provided with identification marks for identifying chromatic dispersion characteristics. In addition, when manufacturing an optical fiber which has chromatic dispersion characteristics which change according to residual stresses, the optical fiber can be provided with identification marks in response to the timing of changing drawing tension.

Figure 7:
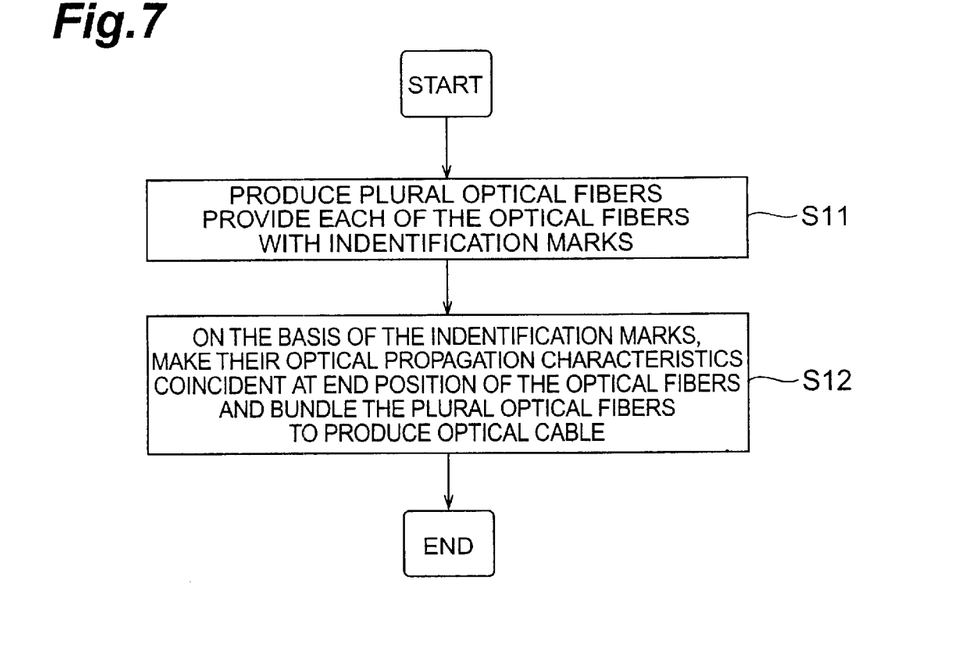
FIG. 7 is a flowchart showing a method of manufacturing the optical cable according to one embodiment of the present invention.

A method of manufacturing the optical cable 1 will be described below. FIG. 7 is a flowchart of an optical cable manufacturing method according to one embodiment of the present invention. First, in Step S11, the optical fibers 10 and 20 are fabricated. As described previously with reference to FIGS. 1, 2A and 2B, each of the optical fibers 10 and 20 changes in chromatic dispersion characteristic in the longitudinal direction and is provided with identification marks for identifying the chromatic dispersion characteristics at individual locations in the longitudinal direction. Each of the optical fibers 10 and 20 is fabricated by the manufacturing method described previously with reference to FIG. 6.

Then, in Step S12 shown in FIG. 7, on the basis of the identification marks which are respectively put on the optical fibers 10 and 20, the optical fibers 10 and 20 are bundled so that their chromatic dispersion characteristics coincide with each other at at least the position of each end of the optical cable 1, then manufacturing the optical cable 1. At this time, if the optical cable 1 is a tape-shaped ribbon, the optical fibers 10 and 20 are coated with a tape coating layer, thereby manufacturing the optical cable 1. If the optical cable 1 is an optical cable, the optical cable 1 is manufactured through each step for forming a cable. Moreover, if the optical cable 2 shown in FIG. 3A is to be manufactured, the member which surrounds the optical fibers 10 and 20 is provided with the identification marks 32 for identifying the chromatic dispersion characteristics at the individual locations in the longitudinal direction, whereby the optical cable 2 is manufactured. To provide the optical cable 2 with the identification marks 32, an ink jet nozzle, a marking part or the like is disposed along a manufacturing line. By such means, the surface of the tape coating layer or the cable sheath of the optical cable 2 is provided with the identification marks 32.

Figure 8:
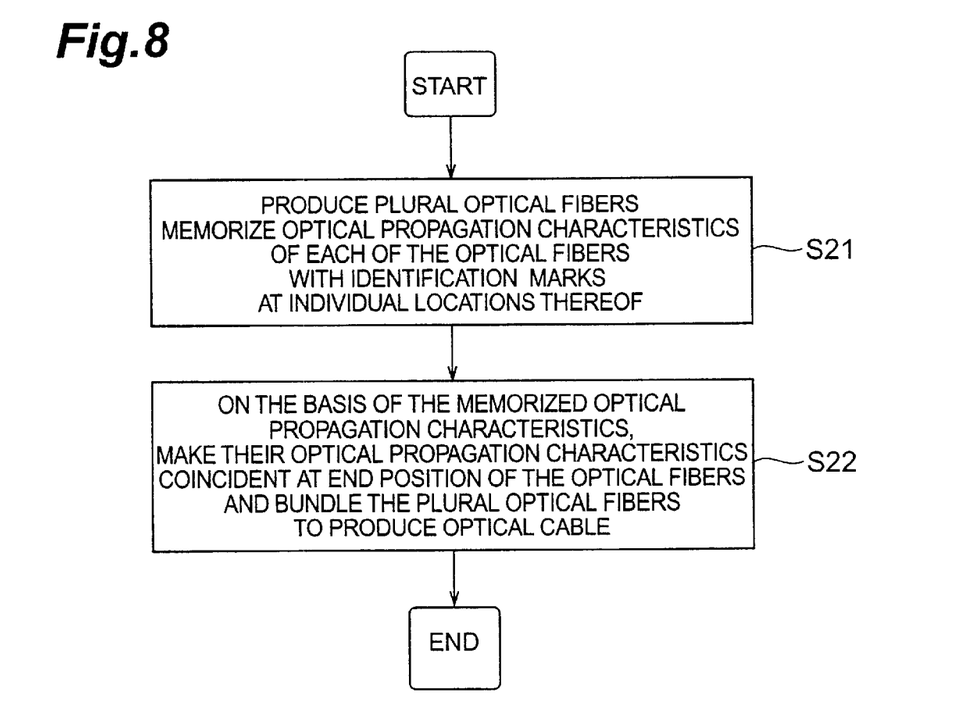
FIG. 8 is a flowchart showing a method of manufacturing the optical cable according to another embodiment of the present invention.

Incidentally, the optical fibers 10 and 20 dose not necessarily be provided with identification marks for identifying chromatic dispersion characteristics at their individual locations in the longitudinal direction, and even if the optical fibers 10 and 20 are not provided with identification marks, the optical cable 1 can be manufactured in the following way. FIG. 8 is a flowchart of an optical cable manufacturing method according to another embodiment of the present invention. First, in Step S21, the optical fibers 10 and 20 are fabricated. Each of the optical fibers 10 and 20 changes in chromatic dispersion characteristic in the longitudinal direction, but may not be provided with identification marks for identifying the chromatic dispersion characteristics. However, when each of the optical fibers 10 and 20 is being fabricated, the relationship between the measured length and the chromatic dispersion characteristic of each of the optical fibers 10 and 20 is confirmed, and the chromatic dispersion characteristics of each of the optical fibers 10 and 20 at its individual locations in the longitudinal direction are memorized on the basis of the measured length.

Then, in Step S22, on the basis of the chromatic dispersion characteristics at the individual locations in the longitudinal direction which have been memorized for the respective optical fibers 10 and 20, the optical fibers 10 and 20 are bundled so that their chromatic dispersion characteristics coincide with each other at at least the position of each end of the optical cable 1, then manufacturing the optical cable 1. At this time, if the optical cable 1 is a tape-shaped ribbon, the optical fibers 10 and 20 are coated with a tape coating layer, thereby manufacturing the optical cable 1. If the optical cable 1 is an optical fiber cable, the optical cable 1 is manufactured through each step for forming a cable. Moreover, if the optical cable 2 shown in FIG. 3A is to be manufactured, the member which surrounds the optical fibers 10 and 20 is provided with the identification marks 32 for identifying the chromatic dispersion characteristics at the individual locations in the longitudinal direction, whereby the optical cable 2 is manufactured.

Incidentally, if the fiber diameter of each of the optical fibers 10 and 20 changes in the longitudinal direction, the fiber diameter can be confirmed by monitoring the outer diameter of the primary coating layer. Accordingly, even if the optical fibers 10 and 20 are not provided with the identification marks, on the basis of the monitored outer diameter of the primary coating layer, the optical fibers 10 and 20 are bundled so that their chromatic dispersion characteristics coincide with each other at at least the position of each end of the optical cable 1, thereby manufacturing the optical cable 1. However, if the chromatic dispersion characteristics of the respective optical fibers are made reliably coincident with each other at the position of each end of the optical cable 1, it is suitable that the optical fibers 10 and 20 should be provided with the identification marks. If the overall chromatic dispersion characteristic of the optical cable 1 is not required to be highly accurate, the chromatic dispersion characteristics of the respective optical fibers 10 and 20 may be made coincident at the position of each end of the optical cable 1 on the basis of the memory of the chromatic dispersion characteristics for the individual positions in the longitudinal direction based on the measured lengths.

Without being restricted to the above-mentioned embodiments, the present invention can be modified in various manners. For example, though the light propagation characteristic of the optical fiber is changed in two stages in the longitudinal direction in the above-mentioned embodiments, more stages may be provided, and the change may be continuous instead of stepwise. The identification marks may not simply distinguish the positive and negative dispersion sections from each other, but they may be provided according to the value of chromatic dispersion in the positive dispersion sections, or they may be provided according to the value of chromatic dispersion in the negative dispersion sections.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multiple fiber optical cable comprising plural optical fibers which have chromatic dispersion characteristics alternately changing in their respective longitudinal directions and which are bundled and the chromatic dispersion characteristics of the respective plural optical fibers coincide with each other at the end positions at least, wherein the chromatic dispersion characteristics of the respective plural optical fibers coincide with each other at individual locations in the longitudinal direction of the multiple fiber optical cable, and a surrounding member of the plural optical fibers is provided with identification marks for identifying the chromatic dispersion characteristics at the individual locations in the longitudinal direction.

2. A multiple fiber optical cable comprising plural optical fibers which have chromatic dispersion characteristics alternately changing in their respective longitudinal directions and which are bundled and the chromatic dispersion characteristics of the respective plural optical fibers coincide with each other at the end positions at least, wherein each of the plural optical fibers is provided with an identification mark for identifying the chromatic dispersion characteristics at its individual locations in the longitudinal direction.

3. A method of manufacturing a multiple fiber optical cable, comprising the steps of:

drawing plural optical fibers which have chromatic dispersion characteristics alternately changing in their respective longitudinal directions;

providing each of the plural optical fibers with identification marks for identifying the chromatic dispersion characteristics at their individual locations in the longitudinal direction; and bundling the plural optical fibers on the basis of the identification marks provided on the respective plural optical fibers so that the chromatic dispersion characteristics of the respective optical fibers coincide with each other at at least end positions of the multiple fiber optical cable.

4. A method of manufacturing a multiple fiber optical cable, comprising the steps of:

drawing plural optical fibers which have chromatic dispersion characteristics alternately changing in their respective longitudinal directions;

memorizing the chromatic dispersion characteristics of each of the plural optical fibers at individual locations in the longitudinal direction when each of the plural optical fibers is being produced; and bundling the plural optical fibers, on the basis of the chromatic dispersion characteristics at the individual locations in the longitudinal direction which are memorized with respect to each of the plural optical fibers, so that the chromatic dispersion characteristics of the respective optical fibers coincide with each other at at least end positions of the multiple fiber optical cable.

* * * * *